A. KIRLIN.
Check-Row.
No. 28,379. Patented May 22. 1860.
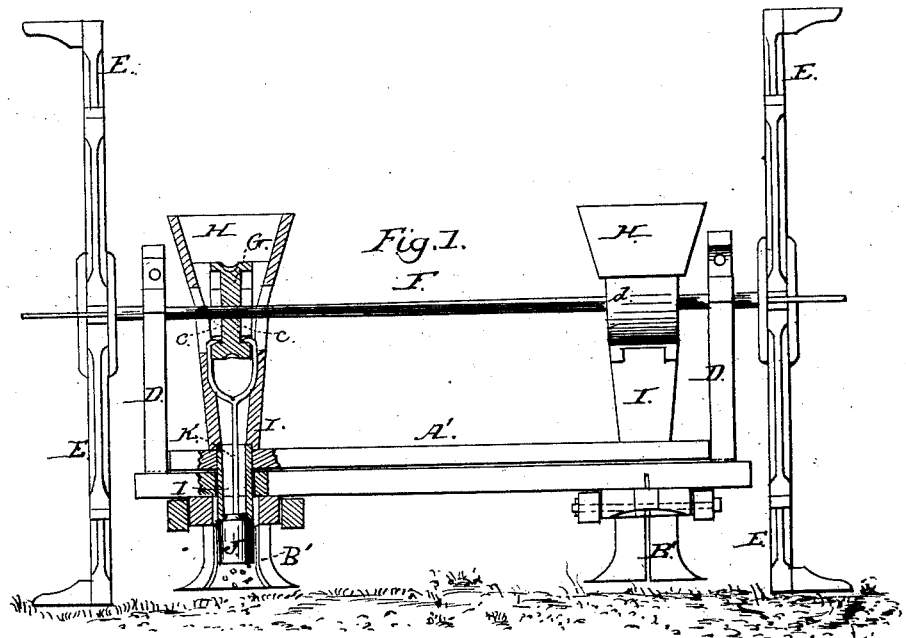
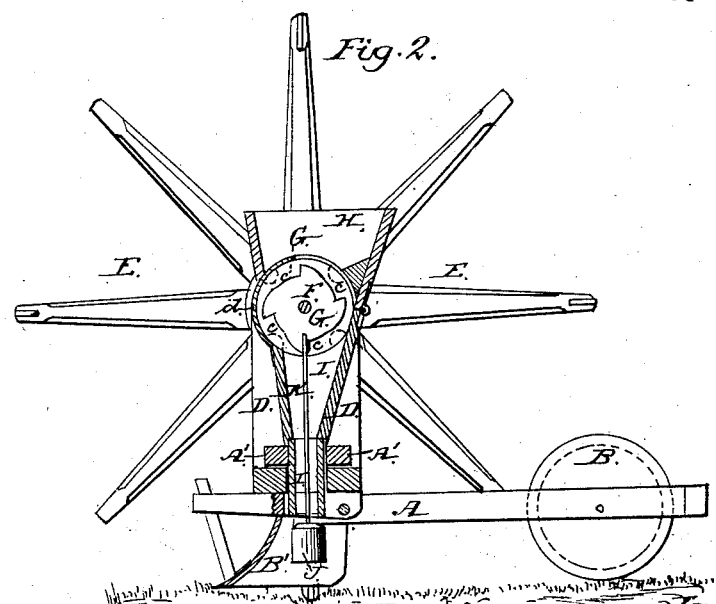

UNITED STATES PATENT OFFICE.

A. KIRLIN, OF NEW BOSTON, ILLINOIS.

IMPROVEMENT IN SEEDING-MACHINES.

Specification forming part of Letters Patent No. 28,379, dated May 22, 1860.

*To all whom it may concern:*

Be it known that I, A. KIRLIN, of New Boston, in the county of Mercer and State of Illinois, have invented a new and Improved Seeding-Machine; and I do hereby declare that the following is a full, clear, and exact description thereof, reference being had to the accompanying drawings, forming a part of this specification, in which—

Figure 1 represents a front elevation of the machine, with a transverse vertical section taken through one of the seed-boxes and tubes and shoe. Fig. 2 shows a vertical longitudinal section taken through one of the seed-boxes, seed-tube, and shoe.

Similar letters of reference indicate corresponding parts in both figures.

This invention is a novel device or arrangement of devices for dropping seed in hills or for sowing them in drills at regular intervals apart, consisting in the arrangement of rotary cylinders in the bottoms of two hoppers for planting in two rows at one time, having suitable cups punched in them for receiving and dropping seed into a vertical seed-tube as they are rotated, and having on each of their sides a number of suitable cams for operating valves placed in the bottoms of the seed-tubes, in the manner hereinafter set forth, so that the dropping of seed—say corn—from the hoppers into the bottom of the tubes and the dropping of said seed from the seed-tubes will take place alternately, thereby enabling me to bring the bottom of the seed-tubes very near to the surface of the ground and drop the seed instantly from them into the hills regularly and without scattering the seed. The motion is to be imparted directly to the seed-cylinders by markers, that lay off the ground into regular check-rows, all as will be hereinafter described and represented.

To enable those skilled in the art to fully understand my invention, I will proceed to describe its construction and operation.

The machine is divided into two parts—viz., a frame, A, that rests at its rear end on grooved pressing-wheels B B, and carries near its front end the two shoes B' B' for opening the earth and covering the seed—having in front of each a colter for assisting in cutting grass, roots, &c. The frame A is connected to that carrying the shoes by a joint that allows the parts to accommodate themselves to the uneven surface of the ground, and a frame, A', that carries the hoppers, seed-tubes, and marking-wheels, which is placed between upright guides D D, projecting up from and fixed to each side of the frame that carries the shoes B' B'. These guides allow to the marking-wheels, hoppers, &c., a free perpendicular motion, so that however rough or uneven the surface of the ground may be the shoes will perform their work perfectly, while the hoppers and markers will rise and fall independently of the frame A or that carrying the shoes. The weight of the marking and seeding arrangement will keep the markers down on the surface of the ground and cause them to turn regularly and space or step off and mark the ground properly.

The markers, lettered E E, consist of a suitable number of radial arms that project from hubs which are secured to the extreme ends of a shaft, F. This shaft passes through upright pieces that extend from the cross-piece of the frame A', and that are placed between the guides D D, above described, and it carries two cylinders or drums, G G, having four depressions in their surfaces, that serve as seed-cups for receiving and conducting the requisite number of grains from each hopper H to the seed-tube I and dropping them into their respective tubes. These tubes are continued down as near to the surface of the ground as is found practicable, and each has a valvular bottom, J, which is opened and closed alternately with the dropping of seed from the hopper into its tube I by means of a rod, K, which is attached to the valve, and by means of a yoke on its upper end, as shown in Fig. 1, which yoke plays over the cams *o* on the sides of the drum G as the drum is turned, and opens and closes the bottom of the tube I and allows the seed to drop therefrom directly into the hills. The cams on the sides of the drums are arranged in such a relation to the seed-cups that the tubes are closed when the seed drops into them and open when it is desired to deposit the charge into a hill.

*d* is a guard for keeping the charges of seed in the cups until they are brought over the tubes.

Having thus described my invention, what I claim as new, and desire to secure by Letters Patent, is—

The drums G G, with their side cams and cups arranged as set forth, and operated by the marker-wheels E E, in combination with the yoke-rods K and valve-bottoms J, as and for the purposes herein set forth.

A. KIRLIN.

Witnesses:
 ALEX. HETFIELD,
 GEO. W. WARNER.